United States Patent [19]

Yoneno et al.

[11] Patent Number: 4,594,279
[45] Date of Patent: Jun. 10, 1986

[54] HEAT INSULATOR

[75] Inventors: Hiroshi Yoneno, Nara; Yoshihiro Matsuo, Neyagawa; Shoichi Ishihara, Katano, all of Japan

[73] Assignee: Matsushita Electric Industrial Co., Ltd., Osaka, Japan

[21] Appl. No.: 654,558

[22] Filed: Sep. 26, 1984

[30] Foreign Application Priority Data

Sep. 28, 1983 [JP] Japan .................. 58-181013

[51] Int. Cl.⁴ .......................... B32B 1/06; B32B 5/16
[52] U.S. Cl. ......................................... 428/69; 428/71; 428/76; 428/920
[58] Field of Search ................... 428/69, 70, 76, 71, 428/920; 252/378 D; 106/DIG. 2

[56] References Cited

U.S. PATENT DOCUMENTS

| 3,151,365 | 10/1964 | Glaser et al. | 428/76 |
| 4,255,489 | 3/1981 | Nielsen | 252/378 D |
| 4,304,824 | 12/1981 | Karpinski | 428/71 |
| 4,492,725 | 1/1985 | Ishihara et al. | 428/69 |

Primary Examiner—Paul J. Thibodeau
Attorney, Agent, or Firm—Birch, Stewart, Kolasch & Birch

[57] ABSTRACT

A heat insulator comprises a vacuum-filled pliable container containing a mass of flaky pearlite particles. The flaky pearlite particles have a thickness not greater than 0.5 micrometer and an average particle size not greater than 100 micrometers.

2 Claims, 2 Drawing Figures

HEAT INSULATOR

BACKGROUND OF THE INVENTION

The present invention generally relates to a heat insulating panel and, more particularly, to a vacuum-packed, powder containing heat insulator.

Hitherto, as a heat insulating panel, glass fibers, rock wool, urethane foam, and others have been employed. Although both the glass fiber and the rock wool have a good heat resistance, they can not give a favorable heat insulating effect in view of the thermal conductivity being within the range of 0.03 to 0.05 Kcal/mh° C. On the other hand, foamed plastics such as, for example, foamed polyurethane and foamed polystyrene are generally used as a low temperature retaining material for use in a refrigerator. While the foamed polyurethane has a thermal conductivity of 0.015 Kcal/mh° C. at 24° C., the state of art is such that the heat insulating property of the foamed polyurethane can no longer be improved. This situation is the same with the foamed polystyrene.

Apart from the above, as a heat insulating panel for use in a pressure vessel for accommodating liguefied petroleum gas or liquid nitrogen, there is also known a vacuum-packed, powder containing a heat insulator comprising a mass of foamed pearlite particles of bubble-like shape, 100 to 300 micrometers in average particle size, filled in a vacuum-packed space defined in of a double-walled structure of the pressure vessel. In this instance, in order to produce a good heat insulating effect, the space in the double-walled structure must be evacuated to a vacuum higher than 0.01 Torr which is not easy to attain within the framwork of industry. By way of example, a Kiney single-stage hydraulic rotary vacuum pump which is largely used by industry has an evacuating capacity which tends to be lowered with an increase in the degree of vacuum. Specifically, when and after the degree of vacuum has attained about 0.05 Torr, the evacuating speed falls abruptly. Therefore, a relatively long time is required to create a vacuum of 0.01 Torr, posing a problem in terms of productivity.

SUMMARY OF THE INVENTION

The present invention has been developed with a view to substantially eliminating the above described disadvantages and inconveniences inherent in the conventional vacuum-packed, powder containing heat insulator and has for its essential object to provide an improved vacuum-packed, powder containing heat insulator which does not require a high vacuum and can be easily manufactured with the degree of vacuum being within the range of 0.01 to 10 Torr.

Another important object of the present invention is to provide an improved vacuum-packed, powder containing a heat insulator of the type referred to above, which is inexpensive and, yet, has a thermal conductivity lower than 0.01 Kcal/mh° C. despite the relatively low degree of vacuum.

In order to accomplish these objects, the present invention provides a heat insulator comprising a vacuum-filled container and a mass of flaky pearlite particles having a thickness not greater than 0.5 micrometer and an average particle size not greater than 100 micrometers.

Because of the employment of the flaky powder having the specific thickness and average particle size, the heat insulator of the present invention can exhibit a thermal conductivity not higher than 0.01 Kcal/mh° C. in the vacuum atmosphere of 0.01 to 10 Torr.

BRIEF DESCRIPTION OF THE DRAWINGS

These and other objects and features of the present invention will become apparent to those skilled in the art from the following description taken in conjunction with a preferred embodiment thereof with reference to the accompanying drawings, in which.

DETAILED DESCRIPTION OF THE EMBODIMENT

Figure 1:
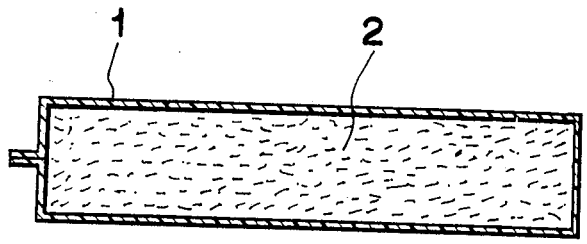
FIG. 1 is a schematic sectional view of a heat insulator embodying the present invention.

Referring first to FIG. 1, reference numeral 1 represents a pliable container made of laminated film. This pliable container 1 has its interior filled with a mass of pearlite particles 2, the interstices among these particles 2 being evacuated to a vacuum.

As one of the essential feature of the present invention, use is made of the mass of flaky pearlite particles having a thickness not greater than 0.5 micrometer and an average particle size not greater than 100 micrometers. In general, the thermal conductivity of a vacuum-packed, powder containing container depends on the degree of vacuum inside the container. The conventionally employed pearlite powder for use for heat insulation in the presence of a vacuum is foamed pearlite particles of generally bubble-like shape having a shell thickness greater than 0.5 micrometer and an average particle size greater than 100 micrometers and, where this conventional pearlite powder is employed, the thermal conductivity at 1 Torr is about 0.02 Kcal/mh° C. at 24° C.

On the contrary thereto, it has been found, as a result of a series of experiments conducted, that, when the flaky pearlite powder having a thickness not greater than 0.5 micrometer and an average particle size not greater than 100 micrometers is employed, the heat insulating property can be improved to such an extent as to exhibit a thermal conductivity of not higher than 0.01 Kcal/mh° C. in the presence of vacuum of 1 Torr.

The flaky pearlite powder employed in the present invention is of a composition containing 70 to 80% of $SiO_2$ and 20 to 30% of $Al_2O_3$ as its principal components and is prepared by finely crushing any one of perlite, obsidian and pitchstone occurring in nature to particles of a size not greater than 30 mesh, then quickly heating them to expand them into foamed pearlite particles of a generally bubble-shape having a shell thickness of not greater than 0.5 micrometer, and finely pulverizing the resultant foamed pearlite particles to an average particle size of not greater than 100 micrometers. Where the flaky pearlite particles have a thickness greater than 0.5 micrometer or an average particle size greater than 100 micrometers, the thermal conductivity of the vacuum-packed heat insulator will be increased to a value higher than 0.01 Kcal/mh° C. Preferably, the flaky pearlite powder having a thickness not greater than 0.3 micrometer and an average particle size not greater than 50 micrometers is used.

The flaky pearlite particles prepared in the manner as hereinbefore described have a flaky shape generally similar to that of crushed fragments of a hen's egg, but when massed together become so bulky as to result in an extremely reduced contact surface with increased voids. Possibly by this reason, it appears that they can participate in the increased heat insulating property at a high pressure.

Because of the small bulk specific gravity, i.e. the bulk specific gravity being not greater than 1.0, the flaky pearlite particles cannot be densely filled in the container. Therefore, in the practice of the present invention, the pliable container made of a laminated film is employed for accommodating the mass of the flaky pearlite particles because, when the pliable container with the mass of the flaky pearlite particles dosposed therein is evacuated to a vacuum and is then air-tightly sealed, the pliable container can be inwardly collapsed to pack the flaky pearlite particles by the effect of the difference in pressure between the interior of the pliable container and the exterior surroundings. Therefore, the packing density of the flaky pearlite particles increases with consequential increase in physical strength.

The pliable container utilizeable in the present invention may be made of a single layer, or a laminated film, of any suitable plastic material, for example, polyethylene, polypropyrene, polyamide, polyester, polyvinylidene chloride, an aluminum-deposited film, or an aluminum foil.

Hereinafter, the present invention will be described by way of examples, which are set forth only for the purpose of illustration and, therefore, are not intended to limit the scope thereof. It is to be noted that, in the following examples, the measurement of the thermal conductivity was carried out for the boundary surface temperature at a cold face temperature of 13° C. and a hot face temperature 35° C. by the use of a K-matic thermal conductivity measuring apparatus, manufactured and sold by Dynatech Co., Ltd., according to a method substantially similar to that stipulated in ASTM-C518.

EXAMPLES 3 samples of pearlite materials were prepared by crushing pearlite to respective particle sizes of not greater than 30 meshes, not greater than 50 meshes and not greater than 100 meshes. These samples were then heated in a heating furnace at 800° to 1,000° C. to allow them to expand to produce the foamed pearlite particles having respective shell thicknesses of 0.8 micrometer, 0.5 micrometer and 0.2 micrometer. These three types of foamed pearlite particles were thereafter finely pulverized to produce the flaky pearlite particles having respective average particle sizes of 5 to 190 micrometers as shown in Table 1.

Samples of the flaky pearlite particles so obtained were respectively filled in laminated film containers made of drawn polyester (thickness:25 micrometers) vapor-deposited with aluminum, polyvinylidene chloride (thickness:15 micrometers) and polyethyrene (thickness:90 micrometers), respectively. The laminated film containers filled with the flaky pearlite particles were placed in a pressure vessel equipped with a heat sealer, which vessel was evacuated by the use of a vacuum pump to 0.01 Torr, 0.1 Torr, 1 Torr, 10 Torr, 100 Torr and 760 Torr one at a time, to thereby evacuate the air inside the laminated film containers, while within the evacuated pressure vessel, the opening of each of the laminated film containers was air-tightly sealed by the use of the heat sealer to complete the vacuum-packed, powder containing heat insulator of a square shape having four sides of 30 cm in length and having a thickness of 2 cm.

The laminated film containers having the flaky pearlite particles filled therein were completely, inwardly collapsed inwardly, i.e., vacuum packaged, representing a shape similar to a square plate.

Figure 2:
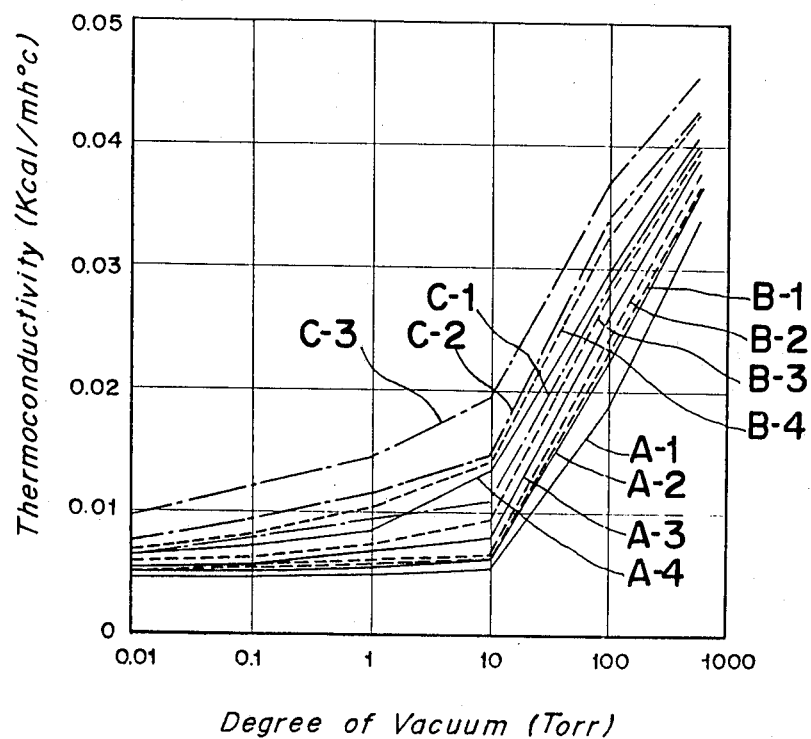
FIG. 2 is a graph showing the relationship between the thermal conductivity and the degree of vacuum.

The thermal conductivity and the density of each of the vacuum-packed, powder containing heat insulators prepared in the manner as hereinbefore described are shown in Table 1 and the graph of FIG. 2.

TABLE 1

| Samples | Characteristics of Flaky Pearlite Particles | | | Insulator Performance | | | |
|---|---|---|---|---|---|---|---|
| | Thickness ($\mu$m) | Average Part. Size ($\mu$m) | Bulk Specific Gravity (g/cm$^3$) | Density (g/cm$^3$) | Thermal Conductivity (Kcal/mh°C.) | | |
| | | | | | 0.1 Torr | 10 Torr | 760 Torr |
| A-1 | 0.2 | 5 | 0.07 | 0.21 | 0.0045 | 0.0055 | 0.0337 |
| A-2 | 0.2 | 40 | 0.06 | 0.17 | 0.0051 | 0.0061 | 0.0362 |
| A-3 | 0.2 | 90 | 0.06 | 0.15 | 0.0054 | 0.0082 | 0.0391 |
| A-4 | 0.2 | 160 | 0.05 | 0.11 | 0.0072 | 0.0135 | 0.0408 |
| B-1 | 0.5 | 10 | 0.08 | 0.25 | 0.0053 | 0.0062 | 0.0369 |
| B-2 | 0.5 | 45 | 0.07 | 0.22 | 0.0056 | 0.0065 | 0.0375 |
| B-3 | 0.5 | 80 | 0.07 | 0.20 | 0.0060 | 0.0094 | 0.0400 |
| B-4 | 0.5 | 190 | 0.06 | 0.17 | 0.0080 | 0.0142 | 0.0425 |
| C-1 | 0.8 | 7 | 0.11 | 0.39 | 0.0079 | 0.0110 | 0.0403 |
| C-2 | 0.8 | 35 | 0.09 | 0.31 | 0.0092 | 0.0145 | 0.0430 |
| C-3 | 0.8 | 140 | 0.08 | 0.25 | 0.0118 | 0.0193 | 0.0458 |

As can be understood from Table 1 and a graph of FIG. 2, a decrease in thickness of the flaky pearlite particles brings about the reduction in thermal conductivity in the vacuum. Also, a decrease in the average particle size thereof tends to bring about a reduction in thermal conductivity in the vacuum. Specifically, it is clear that, where the flaky pearlite particles have a thickness not greater than 0.5 micrometer and an average particle size not greater then 100 micrometers such as in the samples identified by A-1, A-2, A-3, B-1, B-2 and B-3, the heat insulator exhibits a thermal conductivity lower than 0.01 Kcal/mh° C. and is its excellent in heat insulating property.

On the other hand, it is also clear that, where the flaky pearlite particles have a thickness greater than 0.5 micrometer or an average particle size greater than 100 micrometers such as in the samples identified by A-4, B-4, C-1, C-2 and C-3, the degree of vacuum is required to be set at a value much lower than 10 Torr in order for the heat insulator to have a thermal conductivity lower than 0.01 Kcal/mh° C.

Although the present invention has fully been described in connection with the illustrative examples, it is to be noted that various changes and modifications can be readily conceived by those skilled in the art. Such changes and modifications are to be understood as included within the scope of the present invention as defined by the appended claims, unless they depart therefrom.

We claim:

1. A heat insulator comprising a vacuum-filled container containing a mass of flaky pulverized particles of expanded pearlite having a thickness of not greater than 0.5 micrometer and an average particle size of not greater than 100 micrometers, said vacuum in the container being within the range of 0.01 to 10 Torr.

2. A heat insulator having a thermal conductivity of not more than 0.01 Kcal/mh° C., comprising a laminated vacuum-filled container containing a mass of flaky pulverized particles of expanded pearlite having a thickness of not greater than 0.5 micrometer and an average particle size of not greater than 100 micrometers, said vacuum in the container being within the range of 0.01 to 10 Torr.

* * * * *